Patented Oct. 26, 1926.

1,604,425

UNITED STATES PATENT OFFICE.

ALEXANDER SCHWARCMAN, OF BUFFALO, NEW YORK, ASSIGNOR TO SPENCER KELLOGG AND SONS, INC., OF BUFFALO, NEW YORK, A CORPORATION OF NEW YORK.

MAKING VARNISH OIL.

No Drawing.    Application filed June 27, 1925.  Serial No. 40,097.

This invention relates to making varnish oil; and it comprises a method of improving the quality of raw linseed oil for varnish purposes wherein a very small proportion, usually not more than 0.1 per cent, of a non-catalytic oxid in a hydrated state is added to or formed in such oil, the hydrated oxid being usually zinc oxid; all as more fully hereinafter set forth and as claimed.

Raw linseed oil is much used by the varnish maker but for his purposes has the inconvenience that a development of "break" when the oil is heated causes turbidity and darkening of the oil. The "break" is due to the presence of small amounts of various impurities in raw linseed oil which contains a fraction of a per cent of certain mucilaginous and other bodies of whose nature not much is known. It is known however that the "break" is somehow caused by them. Where raw oil is to be used without heating the presence or absence of these bodies makes no great difference. In making varnish with the aid of raw oil however heat is generally applied and the "break" then becomes inconvenient. At a temperature of about 500° F. raw linseed oil develops a turbidity, this being the break, and with further increase in temperature the coagulated matter darkens. And as the coagulum is excessively fine, being colloidal in character, it is practically impossible to remove it from the oil and make a clear varnish. These facts are well known in the trade and it is desirable to be able to furnish the varnish maker with a raw linseed oil having all its usual properties but free of the break. While the break may be, and is, removed by many of the ordinary refining processes, the product is no longer raw oil; the properties of the oil are changed somewhat, as where the oil is treated with a little caustic soda in refining. The oil does not then have its normal acid value and its original properties.

In another and prior Patent No. 1,407,952, February 28, 1922, I have described and claimed a method of improving raw linseed oil to free it of the break while leaving its other properties unchanged; and I have also claimed the improved oil resulting from the practice of my process. The present invention is an improvement over the process of this Patent No. 1,407,952.

In the patented process the oil is treated with a small amount of linoleate of a non-catalytic metal; that is a metal whose compounds do not hasten the oxidation and drying of oil. Catalytic metals are not here desirable for the reason that the object is to prepare an oil having substantially all the properties, save one, of raw oil. The particular non-catalytic metals mentioned in the patent were zinc, calcium and aluminum; the linoleates of these metals being added to the oil to be treated.

I have now found that better results can be obtained by adding to, or forming in, the oil the oxid of such a metal in a fresh reactive and hydrated state. While the hydrated oxid so added or produced probably combines with some of the free fatty acids of the oil, forming for example a linoleate, the amount of oxid which is used in the present invention is so small that no appreciable effect upon the acidity is perceptible. Nor are the other analytical values of the oil affected save for the presence of a "trace" of the added oxid. I find that of the three non-catalytic oxids mentioned in my prior patent, zinc oxid, for the present purposes, is the best. In order to secure the type of oil which I desire, the amount of oxid so incorporated should be very small; not to exceed 0.1 per cent. With many oils the amount may be as low as 0.05 per cent. Why these apparently inappreciable amounts of oxids should cause a suppression of the break I am unaware and content myself with noting the result without speculation as to reasons.

The oxid may be added to, or produced in, the oil in various ways. One suitable way is to emulsify the oil with a little dilute solution of zinc sulfate (or zinc chlorid) containing the amount of zinc which is to be used and then add just enough caustic soda to set free zinc oxid with formation of sulfate of soda. The water used settles out carrying the sulfate of soda in solution. No more than the theoretical amount of caustic soda that is the amount of alkali corresponding to the sulfuric acid of the sulfate of zinc, should be used, since otherwise some of the free fatty acid of the raw linseed oil will be acted on. With equivalent amounts of zinc sulfate and caustic soda the action of the soda is on the sulfate alone. The amount of zinc oxid added is never more than 0.1 per cent and with some oils may be as low as 0.05 per cent. Instead of adding zinc sulfate solutions and caustic soda solutions to the agitated oil seriatim, their water solutions can be mixed in an outside vessel and the aqueous mixture quickly transferred to the oil and incorporated by vigorous agitation.

After the addition is made the oil can be separated from the watery liquid (solution of sodium salts) by settling or in a centrifugal. There is so little of this liquid however that it is in general easier to expose the warm oil to a vacuum treatment to evaporate the water and then filter.

During the operation the oil may be heated somewhat, say to 212°–240° F.

After this operation the oil will be found to retain its normal acid value and all its properties, save that when heated to 500° F. or higher, no break occurs, there is no turbidity or separation of solids or impairment of color or transparency. The oil remains of its original clearness and color. The change in acidity is inappreciable. The oil is well adapted as a varnish oil for kettle boiling.

Instead of using sulfate of zinc, sulfate of alumina or ordinary alum may be employed; the quantities being about the same. Or, chlorid of calcium may be employed. As before caustic soda is added in amount equivalent to the acid component of the particular salt used. However, I find that zinc oxid on the whole produces the best results in the present operation.

What I claim is:—

1. In the treatment of raw linseed oil to improve it for varnish making processes, the method which comprises agitating the oil with freshly precipitated hydrated oxid of a non-catalytic metal; the oxid being added in amounts not greater than 0.1 per cent.

2. In the treatment of raw linseed oil to improve it for varnish making processes, the method which comprises agitating the oil with freshly precipitated hydrated zinc oxid; the oxid being added in amounts not greater than 0.1 per cent.

3. In the treatment of raw linseed oil to improve it for varnish making processes the method which comprises agitating such oil with an aqueous mixture of a solution of a neutral salt of a non-catalytic metal with the equivalent amount of an alkali, the amount of such neutral salt used corresponding to an oxid content not more than 0.1 per cent of the oil.

4. In the treatment of raw linseed oil to improve it for varnish making processes the method which comprises agitating such oil with an aqueous mixture of a solution of a zinc salt with the equivalent amount of an alkali, the amount of such zinc salt corresponding to not more than 0.1 per cent of zinc oxid on the oil treated.

In testimony whereof, I have hereunto affixed my signature.

ALEXANDER SCHWARCMAN.